(12) United States Patent
Cabrera

(10) Patent No.: US 10,365,910 B2
(45) Date of Patent: Jul. 30, 2019

(54) SYSTEMS AND METHODS FOR UNINSTALLING OR UPGRADING SOFTWARE IF PACKAGE CACHE IS REMOVED OR CORRUPTED

(71) Applicant: Citrix Systems, Inc., Fort Lauderdale, FL (US)

(72) Inventor: Frank Carlos Hernandez Cabrera, Plantation, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 15/643,230

(22) Filed: Jul. 6, 2017

(65) Prior Publication Data

US 2019/0012159 A1    Jan. 10, 2019

(51) Int. Cl.
*G06F 9/445* (2018.01)
*G06F 8/61* (2018.01)
*H04L 29/08* (2006.01)
*G06F 11/14* (2006.01)

(52) U.S. Cl.
CPC ............ *G06F 8/62* (2013.01); *G06F 11/1433* (2013.01); *H04L 67/34* (2013.01); *G06F 2201/805* (2013.01)

(58) Field of Classification Search
CPC ... G06F 8/62; G06F 3/123; G06F 8/70; G06F 11/1433; G06F 2201/805; G06F 8/07; H04L 67/34
See application file for complete search history.

(56) References Cited

U.S. PATENT DOCUMENTS

| | | | | |
|---|---|---|---|---|
| 6,085,243 A * | 7/2000 | Fletcher | .................... | G06F 8/65 709/224 |
| 6,363,499 B1 * | 3/2002 | Delo | ......................... | G06F 8/62 714/15 |
| 6,438,749 B1 * | 8/2002 | Chamberlain | ............ | G06F 8/62 714/15 |
| 8,375,381 B1 * | 2/2013 | Clark | ....................... | G06F 8/71 717/170 |
| 8,817,288 B2 * | 8/2014 | Kobayashi | ......... | H04N 1/00344 358/1.13 |
| 8,997,077 B1 * | 3/2015 | Connolly | .......... | G06F 17/30345 717/168 |
| 2001/0012986 A1 * | 8/2001 | Conan | ................. | G06F 11/3688 702/188 |
| 2003/0191823 A1 * | 10/2003 | Bansal | .................... | H04L 67/34 709/220 |

(Continued)

*Primary Examiner* — Adam Lee
(74) *Attorney, Agent, or Firm* — Foley & Lardner LLP; Christopher J. McKenna; Daniel Rose

(57) ABSTRACT

Described embodiments automatically recover missing or corrupted configuration packages or package caches. Upon detecting a failure of an attempt by an installation agent to uninstall or upgrade software, a management agent may identify affected packages or data. The management agent may retrieve a corresponding version of the package from a storage server. The management agent may extract the configuration package or package cache, and restore the affected package. The installation agent may then proceed with uninstalling or upgrading the software. This process may be iteratively repeated for affected packages until the software is fully uninstalled or upgraded.

20 Claims, 3 Drawing Sheets

(56) References Cited

U.S. PATENT DOCUMENTS

| | | | |
|---|---|---|---|
| 2003/0233574 A1* | 12/2003 | Kouznetsov | G06F 21/56 726/23 |
| 2004/0060045 A1* | 3/2004 | Hind | G06F 8/62 717/174 |
| 2005/0034119 A1* | 2/2005 | Koyama | G06F 8/61 717/174 |
| 2005/0091655 A1* | 4/2005 | Probert | G06F 8/62 719/315 |
| 2005/0091658 A1* | 4/2005 | Kavalam | G06F 21/31 718/104 |
| 2005/0203968 A1* | 9/2005 | Dehghan | G06F 8/65 |
| 2006/0168580 A1* | 7/2006 | Harada | G06F 21/10 717/174 |
| 2011/0202433 A1* | 8/2011 | Yokoyama | G06F 21/105 705/28 |
| 2011/0202913 A1* | 8/2011 | Nishimura | G06F 8/61 717/178 |
| 2011/0321034 A1* | 12/2011 | Schiemann | G06F 9/4406 717/174 |
| 2012/0102569 A1* | 4/2012 | Turbin | G06F 21/56 726/24 |
| 2012/0144383 A1* | 6/2012 | Mishra | G06F 11/1433 717/173 |
| 2013/0042232 A1* | 2/2013 | Hirokawa | G06F 8/61 717/174 |
| 2013/0174141 A1* | 7/2013 | Hirokawa | G06F 8/61 717/174 |
| 2013/0210404 A1* | 8/2013 | Curtis | H04L 67/34 455/418 |
| 2014/0282488 A1* | 9/2014 | Tagliabue | G06F 3/1285 717/174 |
| 2014/0372799 A1* | 12/2014 | Wei | G06F 11/1433 714/19 |
| 2015/0178063 A1* | 6/2015 | Narkinsky | G06F 8/658 717/168 |
| 2015/0193240 A1* | 7/2015 | Ben-Itzhak | G06F 9/4406 718/100 |
| 2015/0234793 A1* | 8/2015 | Patel | G06F 17/214 715/269 |
| 2018/0181381 A1* | 6/2018 | Michaely | G06F 9/453 |

* cited by examiner

SYSTEMS AND METHODS FOR UNINSTALLING OR UPGRADING SOFTWARE IF PACKAGE CACHE IS REMOVED OR CORRUPTED

FIELD OF THE DISCLOSURE

The present application generally relates to installing and upgrading of software on computing devices.

BACKGROUND OF THE DISCLOSURE

Many operating systems utilize configuration packages or package caches for installing, upgrading, and uninstalling software, such as the Microsoft Installer (MSI) files developed by Microsoft, Inc., or Debian software package (.deb files) developed by the Debian Project. These configuration packages or package caches include information regarding placement of application files and libraries, registry settings, metadata, and other such information. An application's configuration package or package cache may be maintained on a system after installation of the application, to facilitate upgrading or uninstallation of the application (e.g. by identifying files and libraries to be removed or replaced, etc.).

In some instances, configuration packages may become corrupted or deleted. For example, many disk cleanup utilities attempt to recover space by deleting infrequently used files, which may include configuration packages or package caches. When these files are missing or corrupted, the operating system may fail to properly uninstall or upgrade the corresponding application.

BRIEF SUMMARY OF THE DISCLOSURE

The systems and methods discussed herein provide for automatic recovery of missing or corrupted configuration packages or package caches. Upon detecting a failure of an attempt by an installation agent to uninstall or upgrade software, a management agent may identify affected packages or data. The management agent may retrieve a corresponding version of the package from a storage server. The management agent may extract the configuration package or package cache, and restore the affected package. The installation agent may then proceed with uninstalling or upgrading the software. This process may be iteratively repeated for affected packages until the software is fully uninstalled or upgraded.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1:
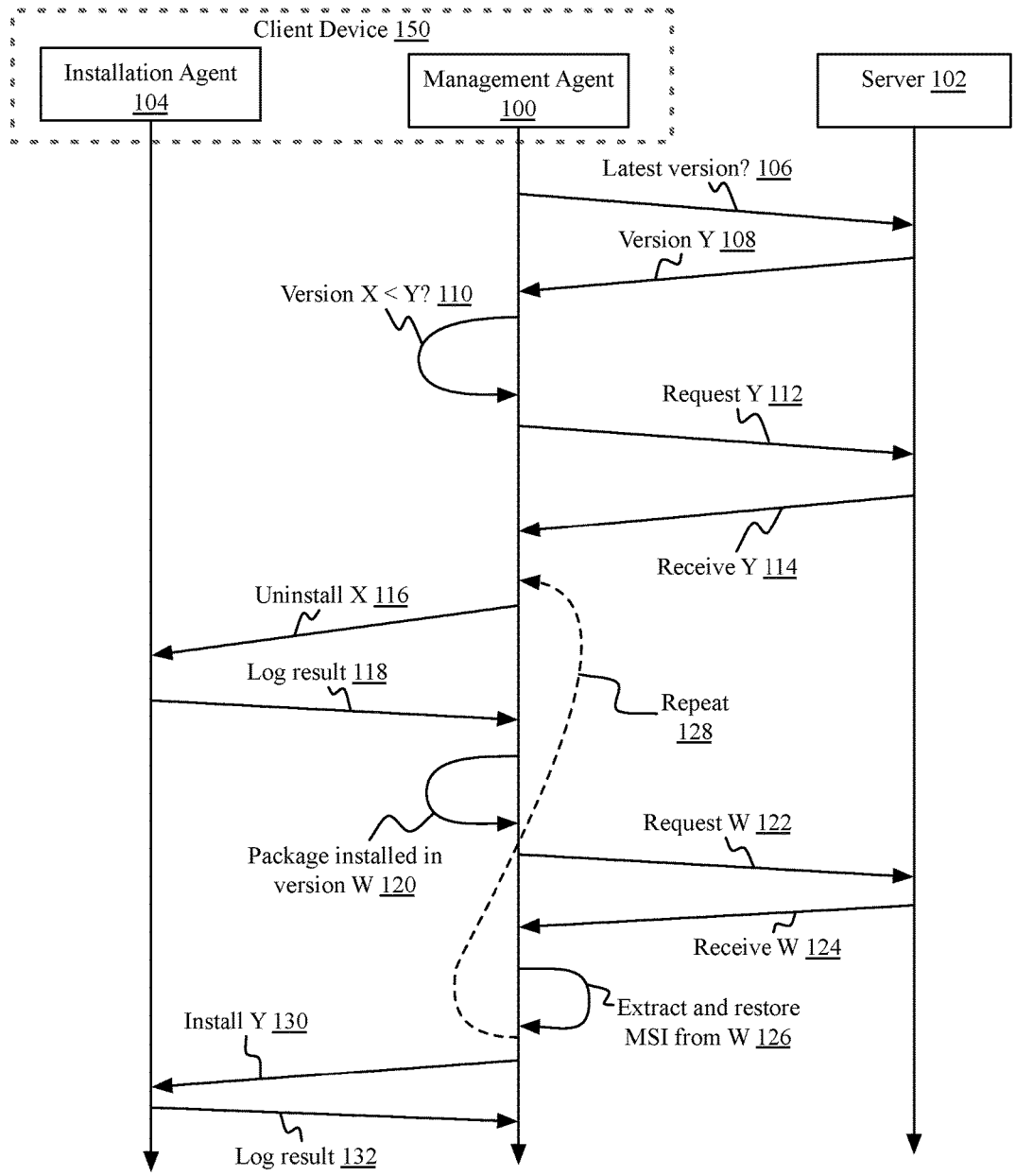
FIG. 1 is a flow diagram of an embodiment of a method for upgrading a software application.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Many operating systems utilize configuration packages for installing, upgrading, and uninstalling software, such as the Microsoft Installer (MSI) files developed by Microsoft, Inc., or Debian software package (.deb files) developed by the Debian Project. These configuration packages, sometimes referred to as package caches, installer data, bundles, or by other such terms, may include (in addition to the data of the application, in many implementations) installation information regarding placement of application files and libraries, registry settings, metadata, and other such information. An application's configuration package or package cache may be maintained on a system after installation of the application, to facilitate upgrading or uninstallation of the application (e.g. by identifying files and libraries to be removed or replaced, etc.). For example, many applications may include components to be installed in library folders, system folders, preference folders, user folders, or other locations, in addition to the executable application itself, which may be installed in an applications folder, shared applications folder, or other location. In some implementations, application installers may create or modify registry keys or system configuration data, or make other such changes. Uninstalling or upgrading these applications may require more than simply removing or replacing the executable application; rather, components in each location may need to be identified and removed or replaced, registry keys removed or modified (e.g. to return to original values or to add new values for an upgraded application), etc. The configuration package may include instructions for reversing these changes, sometimes referred to as a rollback script or by other such terms, that may be executed by an installer to remove the version of the application. Accordingly, configuration packages may be needed long after installation of the application.

In some instances, configuration packages may become corrupted or deleted. For example, many disk cleanup utilities attempt to recover space by deleting infrequently used files, which may include configuration packages or package caches. For example, after installation of an application, the configuration package may not be modified or even read for months or years, in many instances. A disk cleanup utility may identify the package as unused, and the user may inadvertently remove the package. When the system subsequently attempts to remove or upgrade the software, the configuration package may be missing, and the installer may be unable to identify which files were placed and where or what configuration or registry changes were made, resulting in errors and inability to uninstall or upgrade the software. Similarly, in many instances, the configuration package may become corrupted through disk errors. For example, a portion of the package, such as a rollback script, may become unreadable or corrupt. While the package may be present on the system, the installer may be unable to read the package or a portion of the package, resulting in the same inability to identify or locate files or configuration changes. Thus, when configuration packages are missing or corrupted, the operating system may fail to properly uninstall or upgrade the corresponding application.

The systems and methods discussed herein provide for automatic recovery of missing or corrupted configuration packages or package caches. Upon detecting a failure of an attempt by an installation agent to uninstall or upgrade software, a management agent may identify affected packages or data. The management agent may retrieve a corresponding version of the package from a storage server. The management agent may extract the configuration package or package cache, and restore the affected package. The installation agent may then proceed with uninstalling or upgrading the software. This process may be iteratively repeated for affected packages until the software is fully uninstalled or upgraded.

In some implementations, applications may be uninstalled, installed, or upgraded "off-line" or while the application is not executing. In some such implementations, execution of the application may be terminated or stopped, and then the application may be upgraded. In other implementations, applications may be upgraded "on-line" or during execution, sometimes referred to as upgrading "in place". In such implementations, running or executing files may be overwritten.

FIG. 1 is a flow diagram of an implementation of a method for recovery of configuration packages and upgrading of a software application. As shown, a client device 150 may include an installation agent 104 and management agent 100. Although shown as part of client device 150, in some implementations, one or both of management agent 100 and installation agent 104 may be executed by a second device (e.g. an administrator device). The management agent 100 and/or installation agent 104 may be in communication with a server 102 via a network, such as a local area network (LAN) or wide area network (WAN) or combination of one or more LANs and WANs. Server 102 may comprise a server farm, cloud of servers, or cluster, or may comprise one or more physical computing devices, virtual computing devices executed by one or more physical computing devices, or any other such combination of hardware devices.

At step 106, the management agent 100 may transmit a request to server 102 to identify the latest version of one or more items of software. In some implementations, the request may be a request for a current version number, while in other implementations, the request may comprise an identifier of a currently installed version and may seek confirmation that the installed version is the latest version. Accordingly, the request may comprise an identifier of the one or more items of software and, in various implementations, may or may not comprise an identifier of corresponding versions of the one or more items of software. Although primarily discussed in terms of a single software application to be upgraded, in some implementations, multiple items of software may be identified in the request, such as a concatenated string of application names or identifiers, an XML file listing each item, or any other such means.

At step 108, the server may reply with an identification of the most recent version of the software or multiple items of software (e.g. version "Y", as shown). In some implementations, the server may provide a version number or similar identifier. In other implementations, such as where the management agent transmits a request identifying a currently installed version, the server may simply reply with an indication that either the currently installed version is the latest version, or that a new version exists (e.g. via a predetermined bit value, such as 0 if no newer version exists, and 1 if a newer version exists).

In some implementations in which the server responds with an identification of the latest version, at step 110, the management agent may determine if a currently installed version (e.g. version "X", as shown) is an earlier version than the latest version. If the currently installed version is equal to the latest version (or, newer than the latest version, for implementations in which the software may be developed on the client device), then steps 106-110 may be periodically repeated. If the currently installed version is earlier or lower than the latest version, then at step 112, the management agent may transmit a request to the server for the latest version. The request may be transmitted in any type and form, such as an HTTP GET request, an FTP request, or any other file transfer capable protocol. In implementations in which multiple application versions are identified at steps 106-110, the request may comprise a request for a plurality of software packages. At step 114, the server 102 may respond by transmitting the requested software to the client device 150 via any appropriate protocol (e.g. corresponding to the protocol of the request, in many implementations).

At step 116, the management agent 100 may direct the installation agent 104 to uninstall the previous version or versions of the software. In some implementations, the management agent 100 may instantiate the installation agent 104, or cause an operating system of client device 150 to execute the installation agent 104. In other implementations, the installation agent 104 may be executing and idle. The request to uninstall the previous version of the software may, in some implementations, comprise an identifier of a configuration package or package cache corresponding to the previous version of the software.

As discussed above, in some implementations, the configuration package may be located and be not corrupt, and the installation agent 104 may successfully uninstall the previous version of the software. In such implementations, steps 122-126 may be skipped. In other implementations, such as where the configuration package is missing or corrupt, the installation agent 104 may encounter errors during the attempted uninstallation, such as not being able to find a file to be removed or a registry entry to modify. At step 118, the installation agent 104 may generate a log identifying the error and the affected file, key, configuration parameter, or other entity. The log may be retrieved and read by the management agent 100, e.g. from a storage device of the client device 150.

At step 120, the management agent 100 may parse the log to identify the error or errors, and identify the affected file, key, or parameter and what version of the software it was associated with. In many implementations, files or parameters installed with a first version of the software may not be replaced during subsequent upgrades. For example, a library installed during an initial install of an application may be maintained without change through one or more upgraded versions of the application. Because the upgrade does not modify the library, the configuration package associated with the upgrade may not identify the library or location of the library. In similar instances with registry keys or configuration parameters that are not changed during upgrade, the configuration package associated with the upgrade may not identify the prior pre-installation value of the key or parameter. Accordingly, the installation agent 104 may not know how to uninstall the file or remove or reverse modifications.

Once the management agent 100 has identified the version of the software for which the file or parameter associated with the error was installed (e.g. version "W" as shown), at step 122, the management agent 100 may transmit a request to server 102 for the identified version of the software (e.g. version "W"). The request may be of any type and form of protocol, and may be similar to the request transmitted at step 112. The request may be sent to the same server 102 or a different server 102 (e.g. a legacy software server). At step 124, the server may respond with the requested version of the software, similar to the response of step 114.

At step 126, the management agent may extract the configuration package from the received version of the software. In many implementations, as discussed above, the software may include both the executable application and libraries, as well as the configuration package. During uninstallation, the application and libraries may not be utilized or read; instead, merely the configuration package may be extracted from the data and read. The configuration package may be stored in a predetermined portion of the software package (e.g. a header, a first set of blocks, etc.) or may be at a location identified in a header, index, or directory (e.g. at bytes m to n of the software package). The management agent may accordingly extract the configuration package, without needing to read other data. The management agent may restore the missing or corrupt configuration package corresponding to the identified version of the software, and may then, at step 128, repeat steps 116-126 (e.g. requesting the installation agent 104 to uninstall the software, now using the newly restored configuration package, etc.). This may continue iteratively until no errors are generated and uninstallation is successful.

Once uninstallation is complete, then at step 130, the management agent 100 may request the installation agent 104 to install the new version of the software package. The installation agent 104 may install the new version according to a configuration package associated with the new version. If installation is successful, then at step 132, the installation agent 104 may generate a log indicating successful installation of the software. If installation is unsuccessful, steps 116-132 may be repeated with packages retrieved according to identifications of associated files or parameters in the error log.

Figure 2:
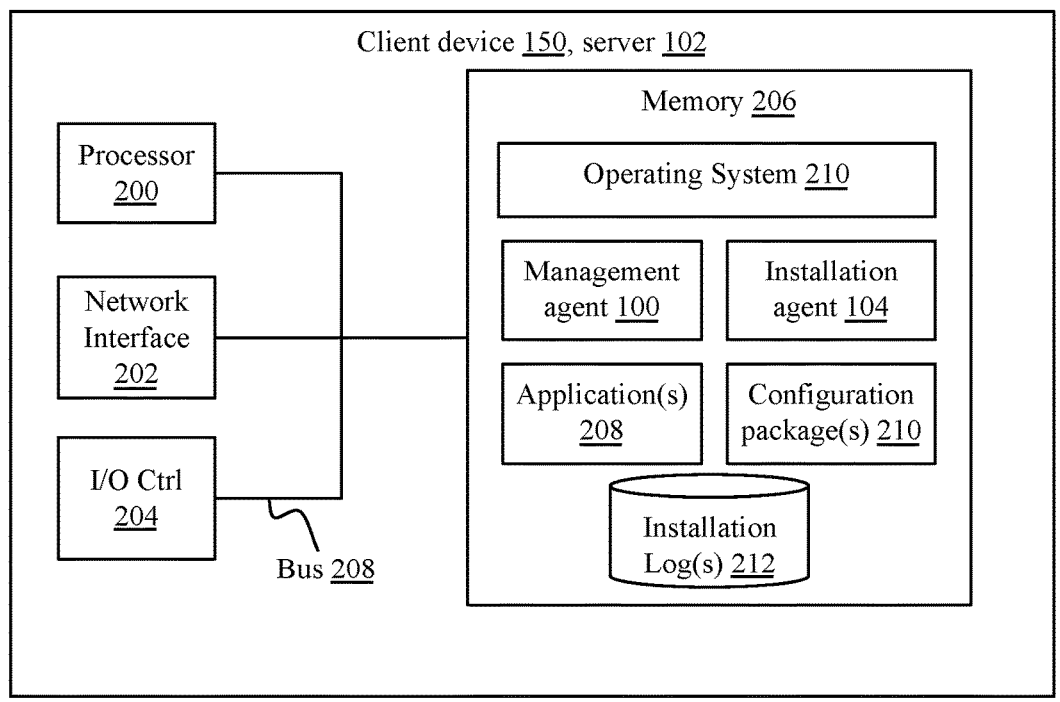
FIG. 2 is a block diagram of an embodiment of a computing device for uninstalling or upgrading software.

Referring to FIG. 2, an embodiment of a computing device is depicted, such as a client device 150 or server 102, as well as other computing devices including client computing devices, server computing devices, workstation devices, cloud computing devices, or any other type and form of computing device, referred to generally herein as a "computing device" or "computing devices". Such devices may include laptop computers, desktop computers, rackmount computers, tablet computers, wearable computers, appliances, cluster devices or appliances, server clouds or farms, virtual machines executed by one or more physical machines, or any other type of computing device. As shown in FIG. 2, a computing device may include one or more central processing units or processors 200, one or more network interfaces 202, one or more input/output controllers or devices 204, one or more memory units 206 which may include system memory such as RAM as well as internal or external storage devices. A computing device may also include other units not illustrated including installation devices, display devices, keyboards, pointing devices such as a mouse, touch screen devices, or other such devices. Memory 206 may include, without limitation, an operating system 210 and/or software.

The central processing unit 200 is any logic circuitry that responds to and processes instructions fetched from the memory 206. In many embodiments, the central processing unit 200 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Memory 206, sometimes referred to as a main memory unit, may be one or more memory chips capable of storing data and allowing any storage location to be directly accessed by the microprocessor 200, such as any type or variant of Static random access memory (SRAM), Dynamic random access memory (DRAM), Ferroelectric RAM (FRAM), NAND Flash, NOR Flash and Solid State Drives (SSD). The memory 206 may be based on any of the above described memory chips, or any other available memory chips capable of operating as described herein. In the embodiment shown, the processor 200 communicates with main memory 206 via a system bus 208 (described in more detail below). In other embodiments, the processor communicates directly with main memory 206 via a memory port. For example, in such embodiments, the memory 206 may be DRDRAM. In other embodiments, processor 200 may communicate directly with cache memory via a secondary bus, sometimes referred to as a backside bus. In other embodiments, the main processor 200 communicates with cache memory using the system bus 208. Cache memory typically has a faster response time than memory accessible via a system bus, and is provided by, for example, SRAM, BSRAM, or EDRAM.

In some embodiments, the processor 200 communicates with various I/O devices 204 via local system bus 208. Various buses may be used to connect the central processing unit 200 to any I/O devices, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 200 may use an Advanced Graphics Port (AGP) to communicate with the display. In some embodiments, the processor 200 may communicate directly with I/O devices, for example via HYPERTRANSPORT, RAPIDIO, or INFINIBAND communications technology. A wide variety of I/O devices may be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 204 as shown in FIG. 2. The I/O controller may control one or more I/O devices such as a keyboard and a pointing device, e.g., a mouse or optical pen. Furthermore, an I/O device may also provide storage and/or an installation medium for the computing device. In still other embodiments, the computing device may provide USB connections (not shown) to receive handheld USB storage devices such as the USB Flash Drive line of devices manufactured by Twintech Industry, Inc. of Los Alamitos, Calif.

The computing device may support any suitable installation device (not illustrated), such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device may further include a storage device, such as one or more hard disk drives or redundant arrays of independent disks, for storing an operating system and other related software, and for storing application software programs such as any program or software for implementing (e.g., configured and/or designed for) the systems and methods described herein. Optionally, any of the installation devices could also be used as the storage device. Additionally, the operating system and the software can be run from a bootable medium.

Furthermore, the computing device may include a network interface 202 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device communicates with other computing devices via any type and/or form of gateway or tunneling protocol such as Secure Socket Layer (SSL) or Transport Layer Security (TLS). The network interface xx18 may include a built-in network adapter, network interface card, PCMCIA network card, card bus network adapter, wireless network adapter, USB network adapter, modem or any other device suitable for interfacing the computing device to any type of network capable of communication and performing the operations described herein.

In some embodiments, the computing device may include or be connected to one or more display devices. As such, any I/O devices and/or the I/O controller 204 may include any type and/or form of suitable hardware, software, or combination of hardware and software to support, enable or provide for the connection and use of the display device(s) by the computing device. For example, the computing device may include any type and/or form of video adapter, video card, driver, and/or library to interface, communicate, connect or otherwise use the display device(s). In one embodiment, a video adapter may include multiple connectors to interface to the display device(s). In other embodiments, the computing device may include multiple video adapters, with each video adapter connected to the display device(s). In some embodiments, any portion of the operating system 210 of the computing device may be configured for using multiple displays. One ordinarily skilled in the art will recognize and appreciate the various ways and embodiments that a computing device may be configured to have one or more display devices.

In further embodiments, an I/O device may be a bridge between the system bus 208 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a Fibre-Channel bus, a Serial Attached small computer system interface bus, a USB connection, or a HDMI bus.

A client device 150 or server 102 of the sort depicted in FIG. 2 may operate under the control of an operating system 210, which control scheduling of tasks and access to system resources. The client device 150 or server 102 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7, 8, or 10, produced by Microsoft Corporation of Redmond, Wash.; MAC OS and iOS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

As discussed above, the computer system can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system has sufficient processor power and memory capacity to perform the operations described herein.

In some embodiments, the computing device may have different processors, operating systems, and input devices consistent with the device. For example, in one embodiment, the computing device is a smart phone, mobile device, tablet or personal digital assistant. In still other embodiments, the computing device is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

The computing device may execute one or more of a management agent 100 and an installation agent 104, and may maintain or read and write applications 208 and corresponding installer or configuration packages 210, as discussed above. In other implementations, other software may be executed by the computing device, including web browsers, configuration applications, text editors or template editors, virtual machine servers, hypervisors, authentication or log-in agents, monitoring systems, or other such features.

A management agent 100, sometimes referred to as a connector, client agent, installation manager, upgrade agent, or by similar terms, may comprise an application, server, service, daemon, routine, or other executable logic executed by the processor of the device. The management agent 100 may be configured to periodically transmit a request to a server (either at a predetermined destination, or at a dynamically identified destination based on a request to a second server or an identifier in a configuration file) for an identification of current versions of one or more software packages. The management agent 100 may communicate with a server using a network interface 202, and may communicate via any type and form of network or combination of networks. A corresponding server, service, daemon, routine, or other executable logic on the server, which may be referred to as a management host, may respond to requests with an identification of current versions of the one or more software packages. The request and response may be in any type and form of protocol. For example, in some implementations, the request may be via a representational state transfer (RESTful) request, such as an HTTP GET or POST query with one or more parameters identifying a corresponding one or more applications. The response may similarly comprise an HTTP status message (e.g. a 200 OK message comprising additional data identifying versions of the requested applications; a 3xx redirection message identifying a location or locations at which the current versions of the applications may be obtained, the version encoded into the URL, etc.). As discussed above, the management agent 100 may request or retrieve new versions of applications 208 for installation by an installation agent 104. The management agent may also request or retrieve older versions of the applications 208 and/or older versions of configuration or installation packages 210. As discussed above, the management agent may be configured to extract a configuration package 210 from a retrieved version of the application 208, and restore a missing or corrupt configuration package 210 to allow the installation agent 104 to properly uninstall the application 208. The management agent may also communicate with the installation agent 104 to request uninstallation and/or installation of applications 208.

An installation agent 104, sometimes referred to as an installer, a package management tool, or by similar terms, may comprise an application, server, service, daemon, routine, or other executable logic executed by the processor of the device. In some implementations, installation agent 104 is part of the operating system 210 of the device. In other implementations, installation agent 104 may be a separate executable program or application. The installation agent 104 may use a configuration package 210 to install and/or uninstall applications 208.

The installation agent 104 may also generate one or more installation logs 212. Installation logs 212 may comprise any type and form of log file, such as an XML file, text file, database, or other type of log or record. Installation logs 212 may comprise identifiers of applications installed or uninstalled; files, libraries, configuration settings, registry keys, etc. that were modified, removed, or added during installation or uninstallation; as well as identifications of any errors that occurred during installation or uninstallation. As discussed above, in some implementations in which the installation agent 104 is requested to uninstall a version of an application, but a configuration package is corrupt or missing, the installation agent 104 may generate an error indicating the lack of a proper configuration package and an identification of the application and version. Installation logs 212 may also include other data, such as times and dates, memory locations, or other such features.

Applications 208 may comprise any type and form of applications, and may be installed and uninstalled by an installation agent 104. As discussed above, in various implementations, applications 208 may be upgraded either offline or in place. Applications 208 may each comprise a plurality of files, including executable files, libraries, data files, parameter or preference files, registry keys, configuration files, graphics, audio files, video files, dictionaries, templates, or any other type and form of data. An application 208 may exist in a plurality of versions, and may be identified by a version number, name, or other indicator.

Configuration packages 210 may comprise instructions for installing and uninstalling an application 208 or version of an application. Configuration packages 210 may be in any type and form, such as Windows MSI files, Debian .deb files, or any other type and form of package. In may implementations, configuration packages 210 may be delivered with a compressed form of an application 208 or version of the application 208. For example, a client device may download a .zip or .tar file and decompress the file into application files and the configuration package. An installation agent 104 may then utilize the configuration package to properly place the application files into the system directory, as well as modify registry settings or configuration parameters.

Although discussed primarily in terms of a client device 150, server 102 may include many of these components, including one or more processors 200, network interfaces 202, I/O controllers 204, memory devices 206, an operating system 210, and storage of applications 208 and/or configuration packages 210. In some implementations, as discussed above, the server 102 may store compressed forms of applications and configuration packages, either separately or together in a single archive. Server 102 may also execute a server, management host, or similar executable logic to receive requests from management agent 100 and deliver versions of applications 208 and/or configuration packages 210 to a client device 150.

Figure 3:
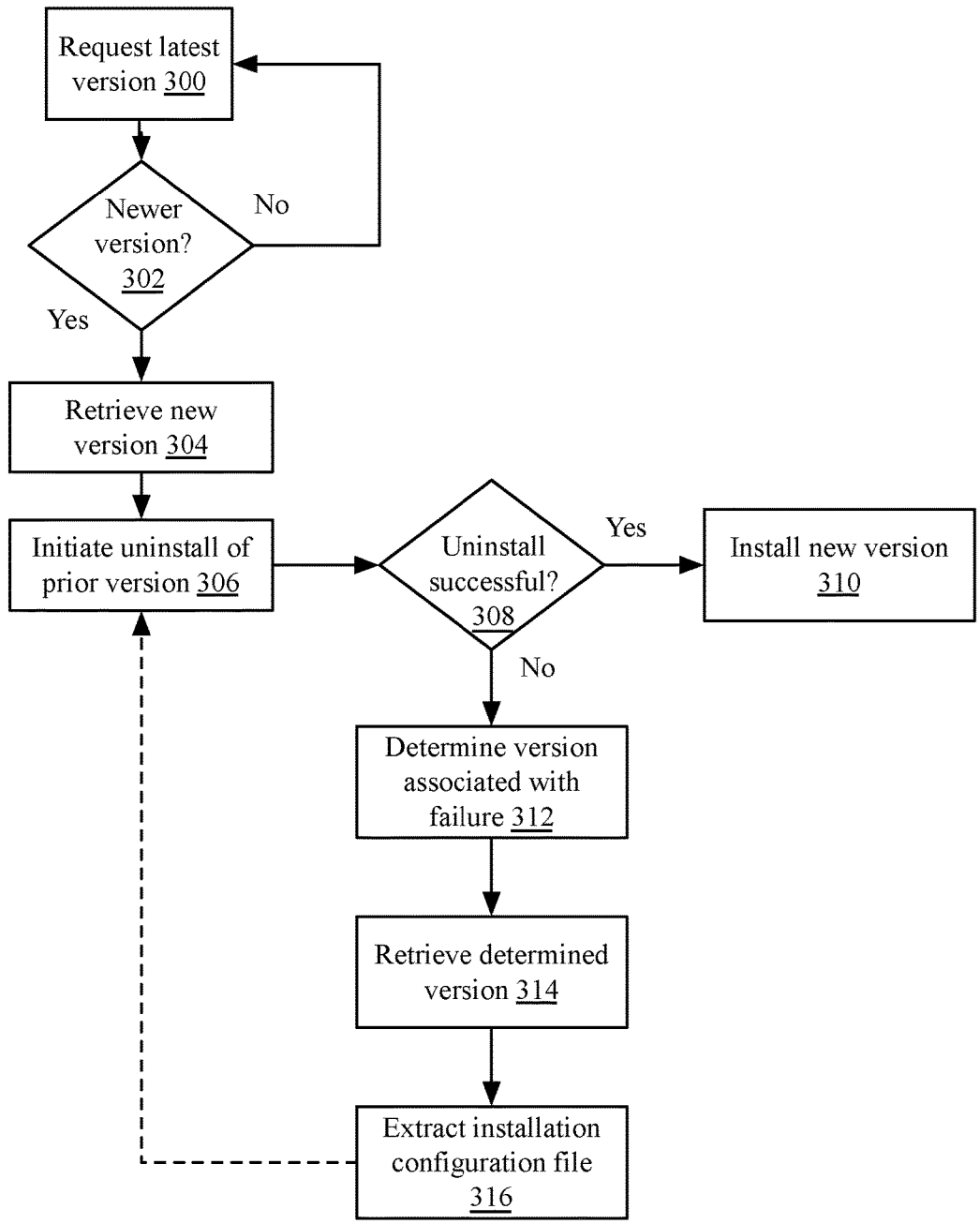
FIG. 3 is a flowchart of a method for uninstalling or upgrading software, according to some embodiments.

FIG. 3 is a flowchart of a method for uninstalling or upgrading software, according to some embodiments. At step 300, a management agent of a client device may request an identification of a latest version of one or more software packages or applications installed on the client device. The request may be transmitted to a management host of a server as discussed above. The request may comprise an identification of the software and, in some implementations, an identification of an installed version of the software. The request may be in any suitable protocol, such as an HTTP request with a set of parameter-value pairs identifying applications and, in some implementations, versions. The server may respond with an identification of a latest version of each of the identified software packages (e.g. a version number or other identifier). In other implementations, such as where the request includes a version number, the server may respond with an indication that a new version does or does not exist.

At step 302, the management agent may determine if a newer version of the software exists than is installed on the client device. The management agent may, for example, compare identified versions received from the server with a manifest or list of installed applications. If a newer version of the software does not exist, then steps 300-302 may be repeated periodically (e.g. every hour, every day, every week, etc.).

If a newer version exists, then at step 304, in some implementations, the management agent may retrieve the newer version of the software. Retrieving the newer version of the software may comprise downloading the software from a URL identified in the response to the request at step 300, downloading the software from a predetermined location or repository, or otherwise retrieving the software. In some implementations, the management agent may transmit a request to another computing device for a location of the latest version of the software, and the other device may respond with an address from which to download the software.

At step 306, the management agent may direct the installation agent to uninstall the prior version of the software. In some implementations, directing the installation agent to uninstall the software may comprise instantiating the installation agent or directing the processor or operating system to begin execution of the installation agent. The direction to uninstall the prior version of the software may comprise an identifier of the software, an identifier of the version, and/or an identifier of a configuration package corresponding to the prior version of the software.

The installation agent may attempt to uninstall the prior version of the software. In some instances, such as where a configuration package is not missing or corrupt, the installation agent may be able to properly uninstall the software and its various components and configurations. The installation agent may signal to the management agent that uninstallation was successful, e.g. via a return value or code, or via an entry in an installation log indicating successful uninstallation. The management agent may, in such embodiments, monitor the installation log for changes and error codes or success messages. The management agent 308 may determine, based on the returned data or codes or the entries in the log whether uninstallation was successful. If uninstallation was successful, then at step 310, the management agent 308 may direct the installation agent to install the newer version of the software retrieved at step 304. As with uninstallation of the prior version, directing the installation agent to install the newer version of the software may comprise instantiating the installation agent or directing the processor or operating system to begin execution of the installation agent. The direction to install the new version of the software may comprise an identifier of the software, an identifier of the version, and/or an identifier of a configuration package corresponding to the new version of the software.

If the management agent determines that uninstallation was not successful, then at step 312, the management agent may determine a version of the software that was associated with the failure to uninstall the application. In some implementations, the management may determine the version by reading an installation log or error log generated by the installation agent. The error log may identify the software, the version, a missing or corrupt configuration package or package cache, or other such error. As discussed above, in some instances, the uninstallation error may be associated with the prior version of the software that the installation agent is attempting to uninstall; however, in other instances, the error may be associated with an earlier version of the software, older than the prior version, such as components that were installed or modified with the earlier version and then not modified or replaced with the prior version, such that the configuration package associated with the prior version may not identify the components. Accordingly, during uninstallation of version "X" of the software, the management agent may determine that an error was associated with earlier version "W".

At step 314, the management agent may retrieve the version of the software corresponding to the determined error. The management agent may retrieve the software in a similar method to step 304, from the same or a different server (e.g. a legacy software repository). Retrieving the version of the software may comprise downloading the software, transmitting a request for the software and receiving the software in response, etc.

At step 316, the management agent may extract a configuration package from the retrieved version of the software corresponding to the determined error. As discussed above, in some implementations, the software may be downloaded in a compressed format, including one or more files of the application as well as the configuration package. The management agent may extract the configuration package in some implementations, without needing to decompress the remainder of the software. In some implementations, the management agent may retrieve only the configuration package from the server, which may be stored together or separate from the remainder of the software. This may reduce bandwidth and storage requirements. The management agent may restore the configuration package for use by the installation agent (e.g. place the configuration package in a predetermined directory, register the configuration package with an index of configuration packages, etc.)

Once the configuration package for the retrieved version is extracted and restored for use by the installation agent, the management agent may initiate uninstall of the retrieved earlier version according to the newly restored configuration package, repeating steps 306-316 as discussed above. This process may be repeated iteratively until the installation agent successfully uninstalls the application at step 308, and may then proceed to install the new version at step 310.

Accordingly, the systems and methods discussed herein provide for automatic recovery missing or corrupted configuration packages or package caches. Upon detecting a failure of an attempt by an installation agent to uninstall or upgrade software, a management agent may identify affected packages or data. The management agent may retrieve a corresponding version of the package from a storage server. The management agent may extract the configuration package or package cache, and restore the affected package. The installation agent may then proceed with uninstalling or upgrading the software. This process may be iteratively repeated for affected packages until the software is fully uninstalled or upgraded.

In one aspect, the present disclosure is directed to a method for maintaining software installs. The method includes detecting, by a maintenance agent executed by a computing device, a failure of an operation to uninstall a software package installed in memory of the computing device. The method also includes determining, by the maintenance agent, a first version of the installed software package. The method also includes transmitting, to a server by the maintenance agent via a network interface of the computing device, a request for the first version of the installed software package. The method also includes receiving, by the maintenance agent from the server, an installer for the first version of the installed software package. The method also includes extracting from the installer, by the maintenance agent, installation information for the first version of the installed software package; and removing, by the maintenance agent, the first version of the installed software package according to the extracted installation information.

In some implementations, the method includes detecting the failure of the operation to uninstall the software package installed in memory of the computing device by receiving a log indicating an error from an installation agent executed by the computing device, the log generated during an attempt to uninstall the software package. In some implementations, the method includes determining the first version of the installed software package by identifying an entry in an installation log corresponding to the installed software package, the entry identifying the first version. In a further implementation, the installed software package includes components of the first version of the installed software package and a second, subsequent version of the installed software package.

In some implementations, the method includes determining, by the maintenance agent, that a newer version of the software package is available; and directing an installation agent executed by the computing device to remove the installed software package, by the maintenance agent, responsive to the determination that the newer version of the software package is available. In a further implementation, the method includes retrieving, by the maintenance agent from the server, the newer version of the software package; and directing the installation agent to install the newer version of the software package, by the maintenance agent, responsive to removing the first version of the installed software package according to the extracted installation information.

In some implementations, the method includes removing the first version of the installed software package according to the extracted installation information by directing an installation agent executed by the computing device to remove the installed software package, by the maintenance agent, according to the extracted installation information. In some implementations, the method includes periodically determining, by the maintenance agent, whether a newer version of the software package is available. In some implementations, the installation information comprises a rollback script. In a further implementation, the method includes detecting the failure of the operation to uninstall the software package by determining that the rollback script is missing or corrupt.

In another aspect, the present disclosure is directed to a system for maintaining software installs. The system includes a maintenance agent executable on a processor of a computing device comprising a network interface and a memory including an installed software package, the maintenance agent in communication with a server via the network interface. The maintenance agent is configured to detect a failure of an operation to uninstall the software package. The maintenance agent is also configured to determine a first version of the installed software package. The maintenance agent is also configured to transmit, to the server via the network interface, a request for the first version of the installed software package. The maintenance agent is also configured to receive, from the server, an installer for the first version of the installed software package. The maintenance agent is also configured to extract, from the installer, installation information for the first version of the installed software package, and remove the first version of the installed software package according to the extracted installation information.

In some implementations of the system, the maintenance agent is further configured to receive a log indicating an error from an installation agent executed by the computing device, the log generated during an attempt to uninstall the software package. In some implementations of the system, the maintenance agent is further configured to identify an entry in an installation log corresponding to the installed software package, the entry identifying the first version. In a further implementation, the installed software package includes components of the first version of the installed software package and a second, subsequent version of the installed software package.

In some implementations of the system, the maintenance agent is further configured to: determine that a newer version of the software package is available, and direct an installation agent executed by the computing device to remove the installed software package, responsive to the determination that the newer version of the software package is available. In a further implementation, the maintenance agent is further configured to: retrieve, from the server, the newer version of the software package, and direct the installation agent to install the newer version of the software package, responsive to removing the first version of the installed software package according to the extracted installation information.

In some implementations of the system, the maintenance agent is further configured to remove the first version of the installed software package according to the extracted installation information by directing an installation agent executed by the computing device to remove the installed software package, according to the extracted installation information.

In some implementations of the system, the maintenance agent is further configured to periodically determine whether a newer version of the software package is available. In some implementations of the system, the installation information comprises a rollback script. In a further implementation, the maintenance agent is further configured to determine that the rollback script is missing or corrupt.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for maintaining software installs, comprising:
    detecting, by an agent executed by a computing device, a failure of an operation to uninstall a software package installed in memory of the computing device;
    determining, by the agent, a first version of the installed software package;
    transmitting, to a server by the agent via a network interface of the computing device, a request for the first version of the installed software package;
    receiving, by the agent from the server, an installer for the first version of the installed software package;
    extracting from the installer, by the agent, installation information for the first version of the installed software package; and
    removing, by the agent, the first version of the installed software package according to the extracted installation information.

2. The method of claim 1, wherein detecting the failure of the operation to uninstall the software package installed in memory of the computing device further comprises receiving a log indicating an error from an installation agent executed by the computing device, the log generated during an attempt to uninstall the first version of the installed software package.

3. The method of claim 1, wherein determining the first version of the installed software package further comprises identifying an entry in an installation log corresponding to the first version of the installed software package, the entry identifying the first version.

4. The method of claim 3, wherein the first version of the installed software package includes components of the first version of the installed software package and a second subsequent version of the first version of the installed software package.

5. The method of claim 1, further comprising:
    determining, by the agent, that a newer version of the first version of the installed software package is available; and
    directing an installation agent executed by the computing device to remove the first version of the installed software package, by the agent, responsive to the determination that the newer version of the software package is available.

6. The method of claim 5, further comprising:
    retrieving, by the agent from the server, the newer version of the first version of the installed software package; and
    directing the installation agent to install the newer version of the first version of the installed software package, by the agent, responsive to removing the first version of the installed software package according to the extracted installation information.

7. The method of claim 1, wherein removing the first version of the installed software package according to the extracted installation information further comprises directing an installation agent executed by the computing device to remove the first version of the installed software package, by the agent, according to the extracted installation information.

8. The method of claim 1, further comprising periodically determining, by the agent, whether a newer version of the first version of the installed software package is available.

9. The method of claim 1, wherein the installation information comprises a rollback script.

10. The method of claim 9, wherein detecting the failure of the operation to uninstall the first version of the installed software package further comprises determining that the rollback script is missing or corrupted.

11. A system for maintaining software installs, comprising:
    a processor of a computing device comprising a network interface and a memory device including an installed software package; and
    an agent executable on the processor, the agent in communication with a server via the network interface, wherein the agent is configured to:
        detect a failure of an operation to uninstall the software package,
        determine a first version of the installed software package,
        transmit, to the server via the network interface, a request for the first version of the installed software package,
        receive, from the server, an installer for the first version of the installed software package, extract, from the installer, installation information for the first version of the installed software package, and remove the first version of the installed software package according to the extracted installation information.

12. The system of claim 11, wherein the agent is further configured to receive a log indicating an error from an installation agent executed by the computing device, the log generated during an attempt to uninstall the first version of the installed software package.

13. The system of claim 11, wherein the agent is further configured to identify an entry in an installation log corresponding to the first version of the installed software package, the entry identifying the first version.

14. The system of claim 13, wherein the first version of the installed software package includes components of the first version of the installed software package and a second subsequent version of the first version of the installed software package.

15. The system of claim 11, wherein the agent is further configured to:

determine that a newer version of the first version of the installed software package is available, and direct an installation agent executed by the computing device to remove the first version of the installed software package, responsive to the determination that the newer version of the first version of the installed software package is available.

16. The system of claim 15, wherein the agent is further configured to:

retrieve, from the server, the newer version of the first version of the installed software package, and direct the installation agent to install the newer version of the first version of the installed software package, responsive to removing the first version of the installed software package according to the extracted installation information.

17. The system of claim 11, wherein the agent is further configured to remove the first version of the installed software package according to the extracted installation information by directing an installation agent executed by the computing device to remove the first version of the installed software package, according to the extracted installation information.

18. The system of claim 11, wherein the agent is further configured to periodically determine whether a newer version of the first version of the installed software package is available.

19. The system of claim 11, wherein the installation information comprises a rollback script.

20. The system of claim 19, wherein the agent is further configured to determine that the rollback script is missing or corrupt.

* * * * *